United States Patent
Park et al.

(10) Patent No.: US 10,669,363 B2
(45) Date of Patent: Jun. 2, 2020

(54) CATALYST COMPOSITION FOR SYNTHESIZING OLEFIN COPOLYMER AND METHOD FOR PREPARING OLEFIN COPOLYMER

(71) Applicant: LG Chem, Ltd., Seoul (KR)

(72) Inventors: Jin Young Park, Daejeon (KR); Yi Young Choi, Daejeon (KR); Bog Ki Hong, Daejeon (KR); Sung Min Lee, Daejeon (KR); Soon Ho Sun, Daejeon (KR); Sun Mi Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/767,920

(22) PCT Filed: Sep. 20, 2017

(86) PCT No.: PCT/KR2017/010334
§ 371 (c)(1),
(2) Date: Apr. 12, 2018

(87) PCT Pub. No.: WO2018/105865
PCT Pub. Date: Jun. 14, 2018

(65) Prior Publication Data
US 2019/0119420 A1  Apr. 25, 2019

(30) Foreign Application Priority Data

Dec. 5, 2016 (KR) ........................ 10-2016-0164338

(51) Int. Cl.
| | |
|---|---|
| C08F 4/653 | (2006.01) |
| C08F 4/6592 | (2006.01) |
| C08F 210/16 | (2006.01) |
| C08F 4/659 | (2006.01) |

(52) U.S. Cl.
CPC ........ *C08F 210/16* (2013.01); *C08F 4/65912* (2013.01); *C08F 4/65916* (2013.01); *C08F 2420/01* (2013.01); *C08F 2420/06* (2013.01)

(58) Field of Classification Search
CPC ............. C08F 4/65904; C08F 4/65927; C08F 4/65925; C08F 210/16
See application file for complete search history.

(56) References Cited

U.S. PATENT DOCUMENTS

| | | | |
|---|---|---|---|
| 4,935,474 A | 6/1990 | Ewen et al. | |
| 5,753,578 A | 5/1998 | Santi et al. | |
| 5,914,289 A | 6/1999 | Razavi | |
| 6,191,294 B1 | 2/2001 | Resconi et al. | |
| 6,482,902 B1 | 11/2002 | Bohnen et al. | |
| 6,828,394 B2 | 12/2004 | Vaughan et al. | |
| 6,841,631 B2 | 1/2005 | Loveday et al. | |
| 6,894,128 B2 | 5/2005 | Loveday et al. | |
| 7,750,082 B2 | 7/2010 | De Cambry De Baudimont et al. | |
| 8,722,833 B2 | 5/2014 | Kipke et al. | |
| 8,969,494 B2 | 3/2015 | Standaert et al. | |
| 9,975,969 B2* | 5/2018 | Cho .................. | C08F 10/02 |
| 2002/0156209 A1 | 10/2002 | Dall'Occo et al. | |
| 2006/0148643 A1 | 7/2006 | Razavi | |
| 2006/0183631 A1 | 8/2006 | Lee et al. | |
| 2015/0284489 A1 | 10/2015 | Nagy et al. | |
| 2017/0029538 A1* | 2/2017 | Song .................. | C08F 4/64 |
| 2017/0107307 A1 | 4/2017 | Park et al. | |
| 2017/0283522 A1 | 10/2017 | Lee et al. | |

FOREIGN PATENT DOCUMENTS

| | | |
|---|---|---|
| CN | 1255925 A | 6/2000 |
| CN | 1711288 A | 12/2005 |
| CN | 101119799 A | 2/2008 |
| CN | 102083902 A | 6/2011 |
| JP | H09286812 A | 11/1997 |
| KR | 20010014072 A | 2/2001 |
| KR | 20040076965 A | 9/2004 |
| KR | 20150058054 A | 5/2015 |
| KR | 20150058938 A | 5/2015 |
| KR | 20150063823 A | 6/2015 |
| KR | 20150066344 A | 6/2015 |
| KR | 20150066484 A | 6/2015 |
| KR | 101618460 B1 | 5/2016 |
| KR | 20160072826 A | 6/2016 |
| KR | 101637026 B1 | 7/2016 |
| KR | 101769097 B1 | 8/2017 |
| WO | 04/076502 A1 | 9/2004 |
| WO | 2016122018 A1 | 8/2016 |
| WO | 2016124157 A1 | 8/2016 |

OTHER PUBLICATIONS

International Search Report for Application No. PCT/KR2017/010334 dated Dec. 26, 2017.
Stürzel et al., "From Multisite Polymerization Catalysis to Sustainable Materials and All-Polyolefin Composites", Chemical Reviews, May 2015, pp. 1398-1433.
Chinese Search Report for Application No. 201780003677.2, dated Mar. 31, 2020, pp. 1-3.
Yang Qing, et al., Progress of the Study on Single-Site Catalysts for Ultrahigh Relative Molecular Mass Polyethylene, Petrochemical Technology, dated Dec. 31, 2012, pp. 609-616, vol. 41, No. 5 (English translation of abstract only).

* cited by examiner

*Primary Examiner* — Caixia Lu
(74) *Attorney, Agent, or Firm* — Lerner, David, Littenberg, Krumholz & Mentlik, LLP

(57) ABSTRACT

The present invention relates to a catalyst composition for synthesizing an olefin copolymer, including a first metallocene catalyst, a second metallocene catalyst, and a third metallocene catalyst, each having a specific structure, and a method for preparing an olefin copolymer using the catalyst composition for synthesizing an olefin copolymer.

10 Claims, No Drawings

CATALYST COMPOSITION FOR SYNTHESIZING OLEFIN COPOLYMER AND METHOD FOR PREPARING OLEFIN COPOLYMER

CROSS-REFERENCE TO RELATED APPLICATION(S)

The present application is a national phase entry under 35 U.S.C. § 371 of International Application No.: PCT/KR2017/010334 filed Sep. 20, 2017, which claims priority from Korean Patent Application No. 10-2016-0164338, filed on Dec. 5, 2016, the disclosure of which are incorporated herein by reference.

TECHNICAL FIELD

The present invention relates to a catalyst composition for synthesizing an olefin copolymer and a method for preparing an olefin copolymer.

BACKGROUND ART

Olefin polymerization catalyst systems can be classified into Ziegler-Natta and metallocene catalyst systems, and these two highly active catalyst systems have been developed in compliance with their characteristics. The Ziegler-Natta catalyst has been widely applied to existing commercial processes since it was developed in the 1950s. However, since the Ziegler-Natta catalyst is a multi-active site catalyst in which a plurality of active sites are mixed, it has a feature that molecular weight distribution of polymers is broad. Also, since compositional distribution of comonomers is not uniform, there is a problem that it has a limitation in securing the desired physical properties.

Meanwhile, the metallocene catalyst includes a combination of a main catalyst whose main component is a transition metal compound, and an organometallic compound cocatalyst whose main component is aluminum. Such a catalyst is a single-site catalyst which is a homogeneous complex catalyst, and offers a polymer having a narrow molecular weight distribution and a uniform composition distribution of comonomers, depending on the single site characteristics. The metallocene catalyst has a feature such that it is capable of changing the stereoregularity, copolymerization properties, molecular weight, degree of crystallinity, and the like of the polymer by changing the ligand structure of the catalyst and the polymerization conditions.

U.S. Pat. No. 5,914,289 discloses a method of controlling the molecular weight and the molecular weight distribution of polymers using metallocene catalysts which are supported on respective supports. However, a large amount of solvent and a long period of time are required to prepare the supported catalysts, and the process of supporting metallocene catalysts on the respective supports is troublesome.

Korean Patent Application No. 10-2003-12308 discloses a method of controlling the molecular weight distribution of polymers by supporting a bi-nuclear metallocene catalyst and a mononuclear metallocene catalyst on a support with an activator, thus changing a combination of catalysts in a reactor and performing polymerization. However, this method has a limitation in simultaneously achieving the properties of the respective catalysts. In addition, there is a disadvantage that a metallocene catalyst portion is liberated from a supported component of the prepared catalyst to cause fouling in the reactor.

Therefore, in order to solve the above-mentioned disadvantages, there is a continuing need to develop a method for preparing olefinic polymers with the desired physical properties by easily preparing a supported hybrid metallocene catalyst having excellent activity.

On the other hand, a linear low density polyethylene is produced by copolymerizing ethylene and alpha olefins using a polymerization catalyst under low pressure. Thus, this is a resin having a narrow molecular weight distribution and a certain length of a short chain branch, without having a long chain branch. The linear low density polyethylene film has high strength and elongation at break in addition to the properties of a general polyethylene, and exhibits excellent tear strength, falling weight impact strength, and the like. This has led to an increase in the use of a stretch film, overlapping films, or the like to which it is difficult to apply existing low density polyethylene or high density polyethylene.

However, a linear low density polyethylene using 1-butene or 1-hexene as a comonomer is mostly prepared in a single gas phase reactor or a single loop slurry reactor, and has high productivity compared to a process using a 1-octene comonomer. However, these products have limitations in the catalyst technology and process technology. Thus, they are problematic in that their physical properties are greatly inferior to when using a 1-octene comonomer, and the molecular weight distribution is narrow, resulting in poor processability. Many studies have been conducted to ameliorate these problems.

U.S. Pat. No. 4,935,474 describes a process for preparing polyethylene having a broad molecular weight distribution by using two or more metallocene compounds. U.S. Pat. No. 6,828,394 discloses a process for producing polyethylene which is excellent in processability and particularly suitable for a film, by using a catalyst system including a poor comonomer incorporating catalyst compound and a good comonomer incorporating catalyst compound. In addition, U.S. Pat. Nos. 6,841,631 and 6,894,128 describe that polyethylene having a bimodal or multimodal molecular weight distribution is produced by using a metallocene-type catalyst including at least two metal compounds, and thus it can be used in various applications such as films, blow molding, and pipes. However, although these products have improved processability, there is still a problem that the dispersed state per molecular weight within unit particles is not uniform, and thus even under relatively good extrusion conditions, the extruded appearance is rough and the physical properties are not stable.

Given the above factors, there is a continuing demand for the production of superior products having a balance between physical properties and processability, and improvement thereof is still necessary.

DISCLOSURE

Technical Problem

It is an object of the present invention to provide a catalyst composition for synthesizing an olefin copolymer which can not only have a wide range of melt flow index and melt flow rate ratio, and thus excellent processability, but can also have high molecular weight, broad molecular weight distribution, and high long-chain branch content, and thus exhibit high dimensional stability while having excellent environmental stress crack resistance and processability, thereby providing an olefin copolymer which can be preferably used for a food container, a bottle cap, or the like requiring stability and chemical resistance in a high temperature and high pressure environment.

It is another object of the present invention to provide a method for preparing an olefin copolymer using the above-mentioned catalyst composition for synthesizing an olefin copolymer.

Technical Solution

According to the present invention, a catalyst composition for synthesizing an olefin copolymer may be provided, including: a first metallocene catalyst containing a transition metal compound represented by the following Chemical Formula 1; a second metallocene catalyst containing a transition metal compound represented by the following Chemical Formula 2; and a third metallocene catalyst containing a transition metal compound represented by the following Chemical Formula 3.

[Chemical Formula 1]

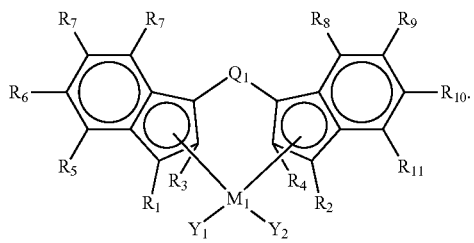

In the above Chemical Formula 1, $R_1$ to $R_4$ are the same as or different from each other and each independently represents hydrogen, a halogen, a C1-C20 linear or branched alkyl group, a C2-C20 linear or branched alkenyl group, a C1-C20 linear or branched alkylsilyl group, a C1-C20 linear or branched silylalkyl group, a C1-C20 linear or branched alkoxysilyl group, a C1-C20 linear or branched alkoxy group, a C6-C20 aryl group, a C7-C20 alkylaryl group, or a C7-C20 arylalkyl group, $Q_1$ represents a C4-C20 alkylene group, a C4-C20 alkenylene group, a C6-C20 arylene group, a C4-C20 cycloalkylene group, a C7-C22 arylalkylene group, or a C5-C22 cycloalkyl alkylene group, $R_5$ to $R_{11}$ are the same as or different from each other and each independently represents hydrogen, a halogen, a C1-C20 linear or branched alkyl group, a C2-C20 linear or branched alkenyl group, a C1-C20 linear or branched alkylsilyl group, a C1-C20 linear or branched silylalkyl group, a C1-C20 linear or branched alkoxysilyl group, a C1-C20 linear or branched alkoxy group, a C6-C20 aryl group, a C7-C20 alkylaryl group, or a C7-C20 arylalkyl group, two or more adjacent substituents on a benzene ring among $R_5$ to $R_{11}$ can be connected to each other to form a substituted or unsubstituted aliphatic or aromatic ring, $M_1$ is a Group 4 transition metal, and $Y_1$ and $Y_2$ are the same as or different from each other and each independently represents a halogen, a C1-C20 alkyl group, a C2-C20 alkenyl group, a C6-C20 aryl group, a nitro group, an amido group, a C1-C20 alkylsilyl group, a C1-C20 alkoxy group, or a C1-C20 sulfonate group.

[Chemical Formula 2]

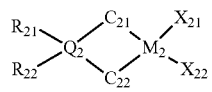

In the above Chemical Formula 2, $M_2$ is a Group 4 transition metal, $X_{21}$ and $X_{22}$ are the same as or different from each other and each independently represents a halogen, a C1-C20 alkyl group, a C2-C20 alkenyl group, a C6-C20 aryl group, a nitro group, an amido group, a C1-C20 alkylsilyl group, a C1-C20 alkoxy group, or a C1-C20 sulfonate group, $Q_2$ is carbon, silicon, or germanium, $R_{21}$ and $R_{22}$ are the same as or different from each other and each independently represents hydrogen, a halogen, a C1-C20 alkyl group, a C2-C20 alkenyl group, a C6-C20 aryl group, a C7-C20 alkylaryl group, a C7-C20 arylalkyl group, a C1-C20 alkoxy group, a C2-C20 alkoxyalkyl group, a C3-C20 heterocycloalkyl group, or a C5-C20 heteroaryl group, and one of $C_{21}$ and $C_{22}$ is represented by the following Chemical Formula 2a, and the other is represented by the following Chemical Formula 2b.

[Chemiacl Formula 2a]

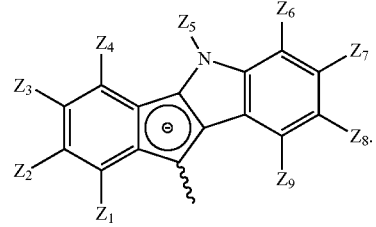

[Chemiacl Formula 2b]

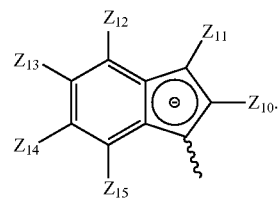

In the above Chemical Formula 2a, $Z_1$ to $Z_9$ are the same as or different from each other and each independently represents a hydrogen, a C1-C20 alkyl group, a C2-C20 alkenyl group, a C1-C20 alkoxy group, a C1-C20 alkylsilyl group, a C1-C20 silylalkyl group, a C6-C20 aryl group, a C7-C20 alkylaryl group, or a C7-C20 arylalkyl group, and in the above Chemical Formula 2b, $Z_{10}$ and $Z_{12}$ to $Z_{15}$ are hydrogen, a halogen, or a C1-C3 alkyl group, and $Z_{11}$ is a C1-C20 alkyl group, a C2-C20 alkenyl group, a C1-C20 alkylsilyl group, a C1-C20 silylalkyl group, a C1-C20 alkoxysilyl group, a C1-C20 ether group, a C1-C20 silyl ether group, a C1-C20 silyloxy group, a C1-C20 alkoxy group, a C2-C20 alkoxyalkyl group, a C6-C20 aryl group, a C7-C20 alkylaryl group, or a C7-C20 arylalkyl group.

[Chemical Formula 3]

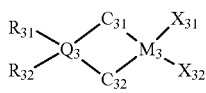

In the above Chemical Formula 3, $M_3$ is a Group 4 transition metal, $X_{31}$ and $X_{32}$ are the same as or different from each other and each independently represents a halogen, a C1-C20 alkyl group, a C2-C20 alkenyl group, a C6-C20 aryl group, a nitro group, an amido group, a C1-C20 alkylsilyl group, a C1-C20 alkoxy group, or a C1-C20 sulfonate group, $Q_3$ is carbon, silicon, or germanium, $R_{31}$ and $R_{32}$ are the same as or different from each other and each independently represents hydrogen, a halogen, a C1-C20 alkyl group, a C2-C20 alkenyl group, a C6-C20 aryl group, a C7-C20 alkylaryl group, a C7-C20 arylalkyl group, a C1-C20 alkoxy group, a C2-C20 alkoxyalkyl group, a C3-C20 heterocycloalkyl group, or a C5-C20 heteroaryl group, and one of $C_{31}$ and $C_{32}$ is represented by the following Chemical Formula 3a or Chemical Formula 3b, and the other of $C_{31}$ and $C_{32}$ is represented by the following Chemical Formula 3c, Chemical Formula 3d, or Chemical Formula 3e.

[Chemical Formula 3a]

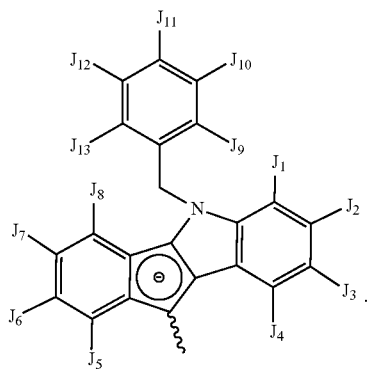

[Chemical Formula 3b]

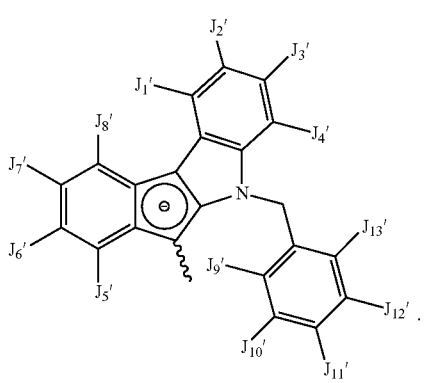

[Chemical Formula 3c]

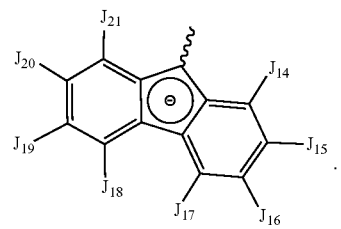

[Chemical Formula 3d]

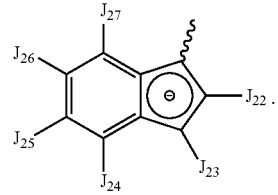

[Chemical Formula 3e]

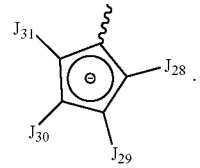

In the above Chemical Formulae 2a, 2b, 3a, 3b, and 3c, $J_1$ to $J_{31}$ and $J_1'$ to $J_{13}'$ are the same as or different from each other and each independently represents hydrogen, a halogen, a C1-C20 alkyl group, a C1-C20 haloalkyl group, a C2-C20 alkenyl group, a C1-C20 alkylsilyl group, a C1-C20 silylalkyl group, a C1-C20 alkoxysilyl group, a C1-C20 alkoxy group, a C6-C20 aryl group, a C7-C20 alkylaryl group, or a C7-C20 arylalkyl group, one or more of $J_9$ to $J_{13}$ and $J_9'$ to $J_{13}'$ is a C1-C20 haloalkyl group, and two or more adjacent substituents on a benzene ring among $J_1$ to $J_{31}$ and $J_1'$ to $J_{13}'$ can be connected to each other to form a substituted or unsubstituted aliphatic or aromatic ring.

The present inventors found through experiments that when (co)polymerization reaction is carried out by using a catalyst composition including a first metallocene catalyst containing the transition metal compound of Chemical Formula 1, a second metallocene catalyst including the transition metal compound of Chemical Formula 2, and a third transition metal compound of Chemical Formula 3, each having the specific structure described above, it is possible to provide an olefin copolymer which can not only have a wide range of melt flow index and melt flow rate ratio, and thus excellent processability, but can also have a high molecular weight, a broad molecular weight distribution, and a high long-chain branch content, and thus exhibit high dimensional stability while having excellent environmental stress crack resistance and processability, thereby providing an olefin copolymer, and completed the present invention. Such olefin copolymer can have high dimensional stability under a high pressure and high temperature environment and thus can be preferably used for a food container, a bottle cap, or the like.

More specifically, the polyethylene copolymer provided using the catalyst composition for synthesizing an olefin copolymer can not only have a wide range of melt flow index and melt flow rate ratio and thus excellent processability, and have a high molecular weight, a broad molecular weight distribution, and a high long-chain branch content, but can also have environmental stress crack resistance of 200 hours or more, or 300 hours or more, and a spiral flow length of 13 cm or 15 cm or more under a high temperature of about 190° C. and pressure of about 90 bar, and can further exhibit high dimensional stability while exhibiting a dimensional change rate of about 2% or less under high temperature and high pressure conditions.

The transition metal compound of Chemical Formula 1 has a structure in which a transition metal has a coordinate bond between two indene derivatives, and $Q_1$ having a specific structure connects the two indene derivatives. As the indene derivative having relatively small steric hindrance has a structure connected via $Q_1$ having the above-mentioned specific structure, monomers such as ethylene can easily access the central metal of the transition metal compound and thus achieve higher copolymerization activity, and further exhibit low hydrogen reactivity and thus produce a middle molecular weight olefin polymer without deteriorating the reaction activity even when MI, MFRR, and the like are controlled by adding hydrogen.

The transition metal compound of Chemical Formula 2 forms a structure in which an indenoindole derivative and an indene derivative are asymmetrically cross-linked by a bridge, and has an unshared electron pair capable of acting as a Lewis base in the structure of the ligand, thereby exhibiting high polymerization activity. In addition, the electron-rich indenoindole derivative stabilizes beta-hydrogen atoms of the polymer chain where nitrogen atoms are grown by hydrogen bonding, and suppresses beta-hydrogen elimination, thereby polymerizing a high molecular weight olefinic polymer. Further, by including the indene derivative having relatively small steric hindrance, it is possible to exhibit high copolymerization activity and low hydrogen reactivity and thus polymerize a middle and high molecular weight olefin polymer with high activity.

In particular, the transition metal compound of Chemical Formula 2 has a structure having a substituent ($Z_{11}$) at a specific position of the indene derivative compound of Chemical Formula 2b, and it can have excellent activity as compared with a metallocene compound containing a unsubstituted indene compound or an indene compound substituted at another site.

The transition metal compound of Chemical Formula 3 forms a structure in which an indenoindole derivative and a cyclopentadiene derivative are asymmetrically crosslinked by a bridge and has an unshared electron pair capable of acting as a Lewis base in the structure of the ligand, thereby exhibiting high polymerization activity even when supported on a surface having a Lewis acid property of a support. In addition, by including the electron-rich indenoindole derivative and a cyclopentadiene group, the activity is high, and excellent copolymerizability and high activity are maintained due to appropriate steric hindrance and the electronic effect of the ligand. Moreover, beta-hydrogen of the polymer chain in which the nitrogen atom of the indenoindole derivative grows can be stabilized by hydrogen bonding to suppress beta-hydrogen elimination and polymerize an ultra-high molecular weight polyolefin.

In particular, one or more of $J_9$ to $J_{13}$ and $J_9'$ to $J_{13}'$ in the transition metal compound of Chemical Formula 3 includes a C1-C20 haloalkyl group. For example, a fluoroalkyl group, that is, $CF_3$ or the like, can be mentioned. It acts like the nitrogen atom of the indenoindole derivative, which stabilizes beta-hydrogen of a growing polymer chain by hydrogen bonding, further suppresses beta-hydrogen elimination, and more effectively achieves the polymerization of the ultra-high molecular weight polyolefin. In other words, the basic skeleton of the catalyst in which the indenoindole derivative and the cyclopentadiene derivative are asymmetrically cross-linked by a bridge is maintained, and substituents such as $CF_3$ which is a stronger hydrogen bond acceptor is introduced, and beta-hydrogen is stabilized by hydrogen bonding, thereby enhancing the effect of suppressing beta-hydrogen elimination and enabling the polymerization of ultra-high molecular weight polyolefin.

In the present specification, an arylalkylene group means a functional group in which one or more aryl groups and one or more alkylene groups are bonded to each other, and the remaining one point of attachment of the alkyl groups is bonded to indene. Also, the cycloalkyl alkylene group means a functional group in which one or more cycloalkyl groups and one or more alkylene groups are bonded to each other, and the remaining one point of attachment of the alkyl groups is bonded to indene.

Specific examples of the transition metal compound of Chemical Formula 1 are not limited by a part of the description range of the above-mentioned chemical formula, and more preferable examples are as follows.

In Chemical Formula 1, $R_1$ and $R_2$ are a C1-C20 alkylsilyl group or a C1-C20 silylalkyl group, and $R_3$ and $R_4$ are a C6-C20 arylene group or a C8-C22 aryl dialkylene group, $R_5$ to $R_{11}$ are each independently hydrogen, a halogen, or a C1-C20 linear or branched alkyl group, $M_1$ is titanium, zirconium, or hafnium, and $Y_1$ and $Y_2$ are independently a halogen.

Specific examples of the transition metal compound of Chemical Formula 2 are not limited by a part of the description range of the above-mentioned chemical formula, and more preferable examples are as follows.

$Z_1$ to $Z_9$ in Chemical Formula 2a are each independently hydrogen, a methyl group, an ethyl group, a propyl group, an isopropyl group, an n-butyl group, a tert-butyl group, a pentyl group, a hexyl group, a heptyl group, an octyl group, an ethylene group, a propylene group, a butenyl group, a phenyl group, a benzyl group, a naphthyl group, a methoxy group, an ethoxy group, or a tert-butoxyhexyl group, $Z_{11}$ in Chemical Formula 2b is a methyl group, an ethyl group, a propyl group, an isopropyl group, an n-butyl group, a tert-butyl group, a pentyl group, a hexyl group, a heptyl group, an octyl group, an ethylene group, a propylene group, a butenyl group, a phenyl group, a benzyl group, a naphthyl group, a trimethylsilyl group, a triethylsilyl group, a tripropylsilyl group, a tributylsilyl group, a triisopropylsilyl group, a trimethylsilylmethyl group, a tert-butyldimethylsilyl ether group, a methoxy group, an ethoxy group, or a tert-butoxyhexyl group, $R_{21}$ and $R_{22}$ in Chemical Formula 2 may independently be a methyl group or a tert-butoxyhexyl group.

Specific examples of the compound represented by Chemical Formula 2a include, but are not limited to, compounds represented by one of the following structural formulae. In the following structural formulae, the remaining reaction site of the cyclopentadienyl group means the point of attachment.

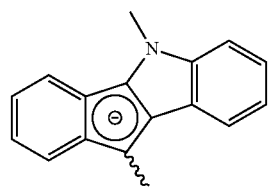

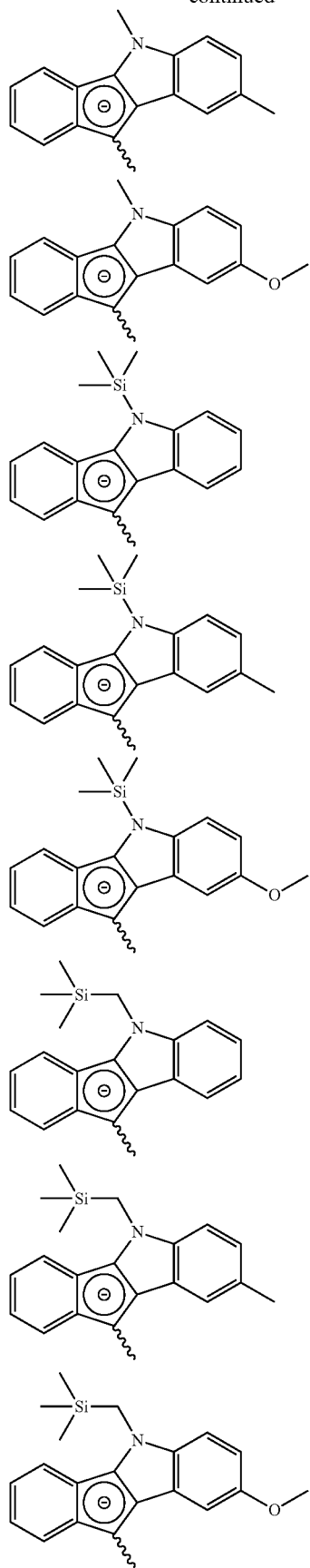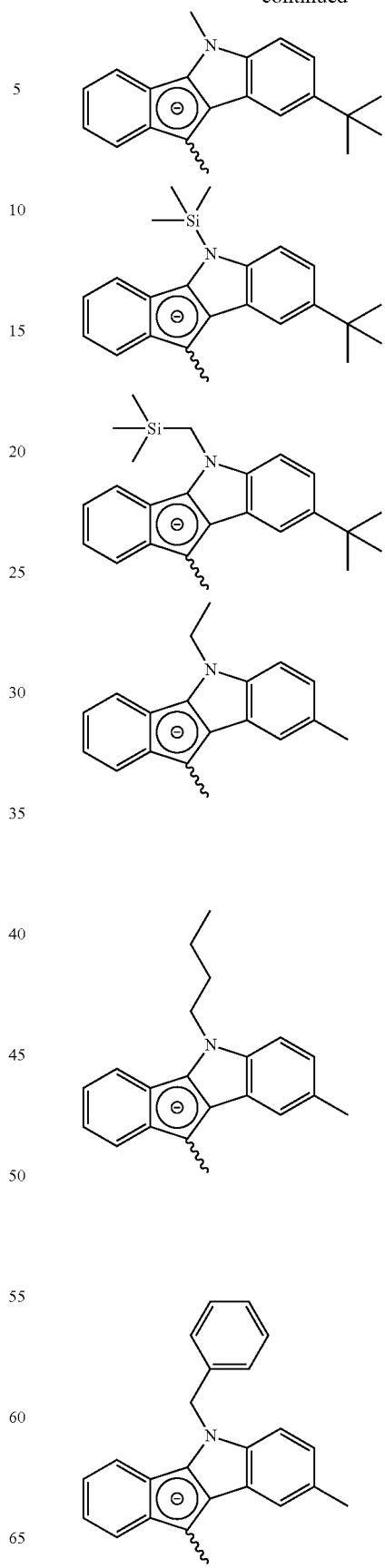

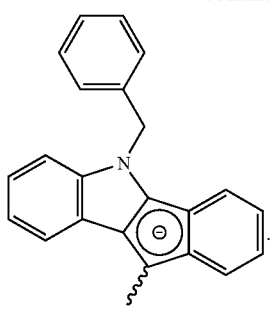

Further, specific examples of the compound represented by Chemical Formula 2b include, but are not limited to, compounds represented by one of the following structural formulae. In the following structural formulae, the remaining reaction site of the cyclopentadienyl group means the point of attachment.

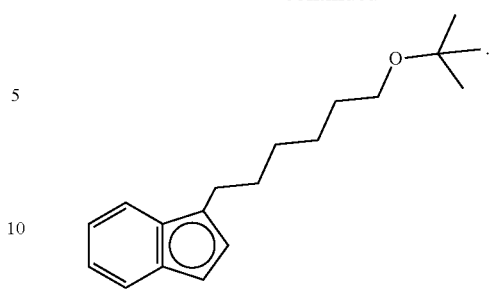

Specific examples of the transition metal compound of Chemical Formula 2 include, but are not limited to, compounds represented by one of the following structural formulae.

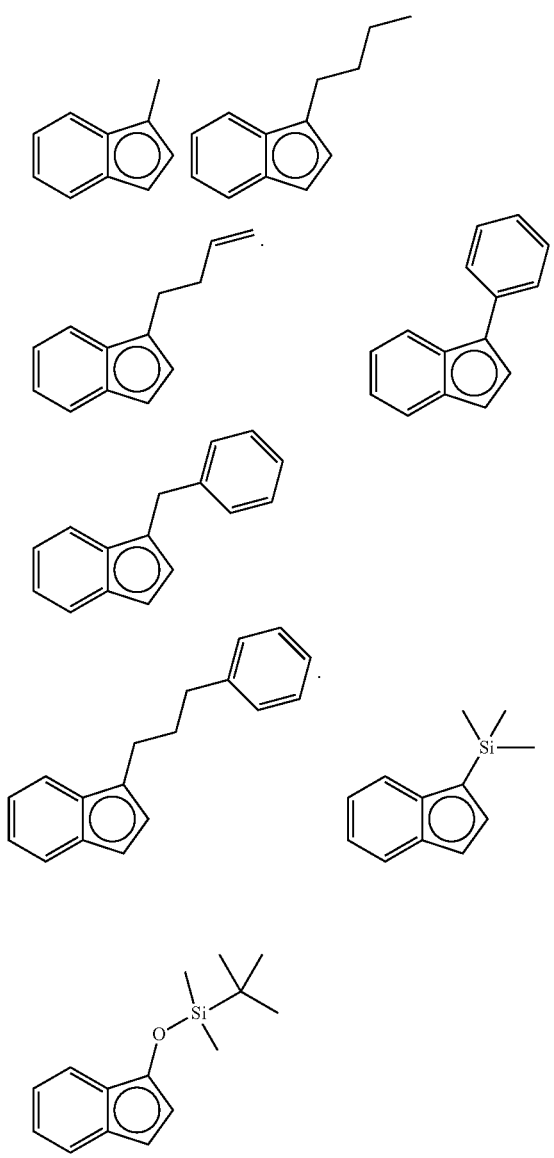

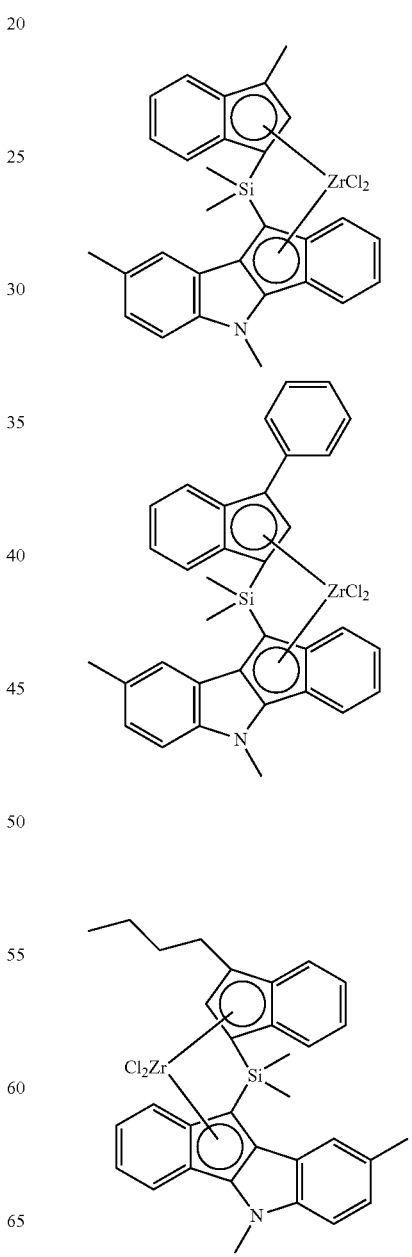

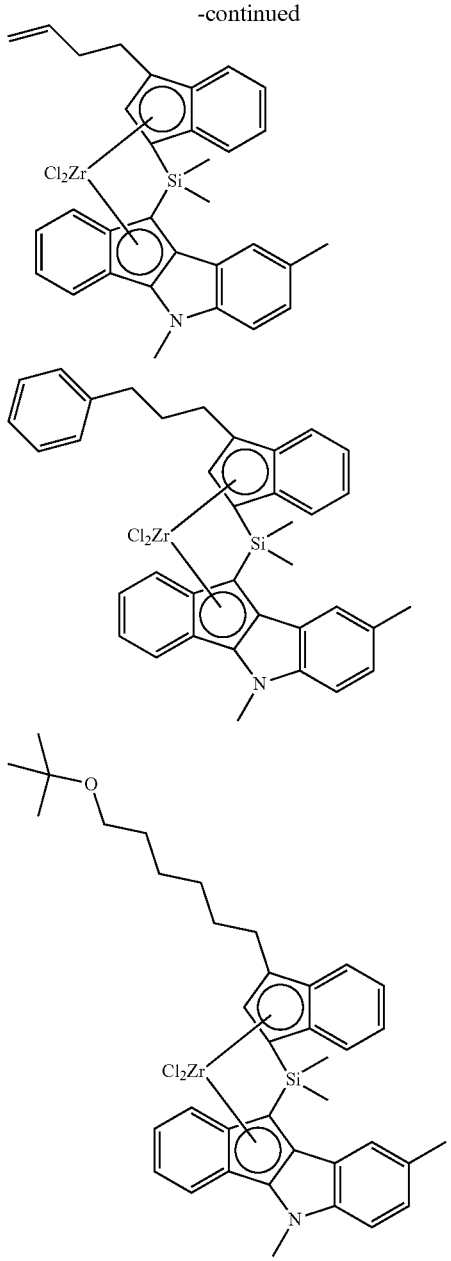

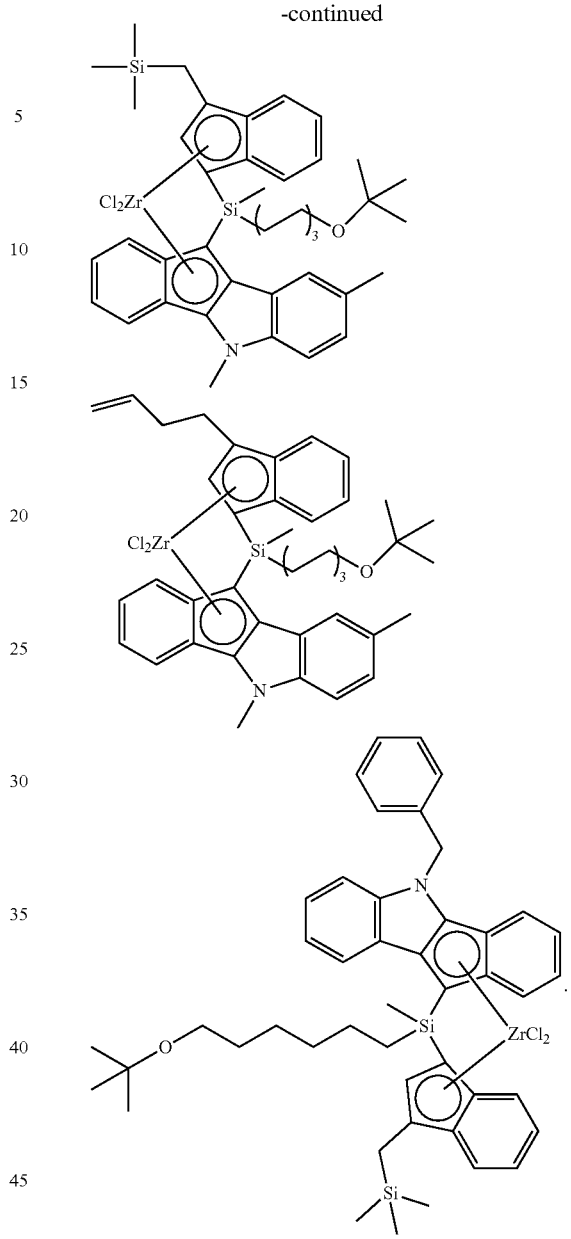

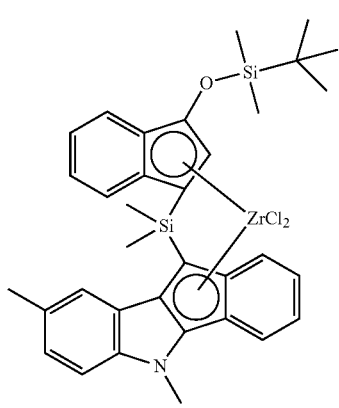

Specific examples of the transition metal compound of Chemical Formula 3 are not limited by a part of the description range of the above-mentioned chemical formulae, and more preferable examples are as follows.

$J_1$ to $J_{31}$ and $J_1'$ to $J_{13}'$ in Chemical Formulae 3a, 3b, 3c, 3d, and 3e may each independently be hydrogen, a methyl group, an ethyl group, a propyl group, an isopropyl group, an n-butyl group, a tert-butyl group, a pentyl group, a hexyl group, a heptyl group, an octyl group, a phenyl group, a halogen group, a trimethylsilyl group, a triethylsilyl group, a tripropylsilyl group, a tributylsilyl group, a triisopropylsilyl group, a trimethylsilylmethyl group, a methoxy group, or an ethoxy group, and at least one of $J_9$ to $J_{13}$ and $J_9'$ to $J_{13}'$ may be perfluoroalkyl having 1 to 3 carbon atoms.

$R_{31}$ and $R_{32}$ in Chemical Formula 3 may each independently be hydrogen, a methyl group, an ethyl group, a propyl group, an isopropyl group, an n-butyl group, a tert-butyl group, a methoxymethyl group, a tert-butoxymethyl group, a tert-butoxyhexyl group, a 1-ethoxyethyl group, a 1-methyl-1-methoxyethyl group, a tetrahydropyranyl group, or a tetrahydrofuranyl group.

Specific examples of the compound represented by Chemical Formula 3a include, but are not limited to, compounds represented by the following structural formula. In the following structural formula, the remaining reaction site of the cyclopentadienyl group means the point of attachment.

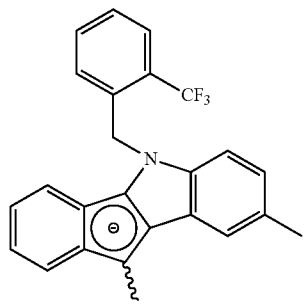

Further, specific examples of the compound represented by Chemical Formula 3b include, but are not limited to, compounds represented by the following structural formula. In the following structural formula, the remaining reaction site of the cyclopentadienyl group means the point of attachment.

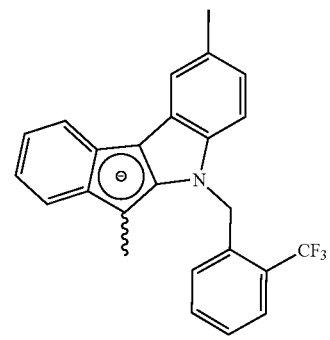

Specific examples of the compound represented by Chemical Formula 3c include, but are not limited to, compounds represented by one of the following structural formulae. In the following structural formulae, the remaining reaction site of the cyclopentadienyl group means the point of attachment.

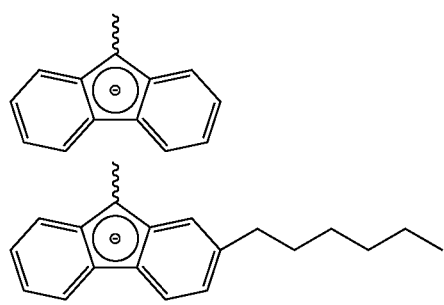

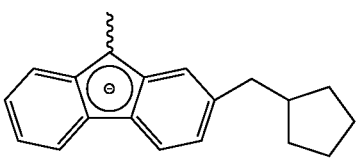

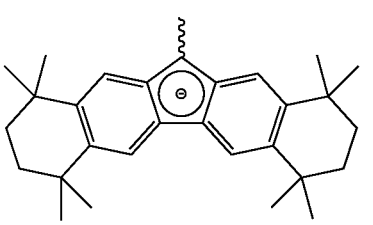

Specific examples of the compound represented by Chemical Formula 3d include, but are not limited to, compounds represented by the following structural formula. In the following structural formula, the remaining reaction site of the cyclopentadienyl group means the point of attachment.

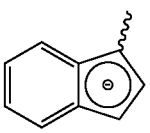

Specific examples of the compound represented by Chemical Formula 3e include, but are not limited to, compounds represented by the following structural formula. In the following structural formula, the remaining reaction site of the cyclopentadienyl group means the point of attachment.

Specific examples of the transition metal compound of Chemical Formula 3 include, but are not limited to, a compound represented by the following structura l formula.

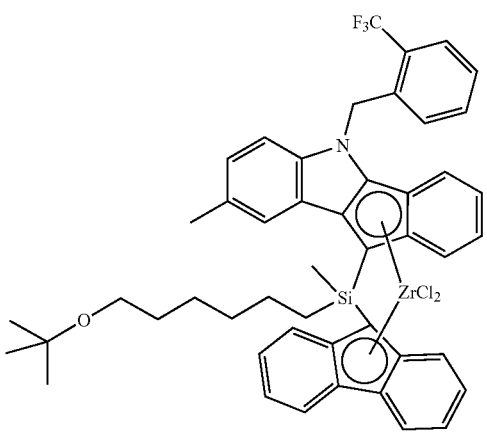

Meanwhile, in the catalyst composition for synthesizing an olefin copolymer, the molar ratio between a first metallocene catalyst containing a transition metal compound of Chemical Formula 1, a second metallocene catalyst containing a transition metal compound of Chemical Formula 2, and a third metallocene catalyst containing a transition metal compound of Chemical Formula 3 is not particularly limited. However, in order to maximize the above-mentioned effects, for example, the effects of having a wide range of melt flow index and melt flow rate ratio, and achieving excellent environmental stress crack resistance and processability as well as dimensional stability while exhibiting a higher molecular weight, a broad molecular weight distribution, and a high long-chain branch content, the molar ratio of a first metallocene catalyst containing a transition metal compound of Chemical Formula 1 and a third metallocene catalyst containing a transition metal compound of Chemical Formula 3 relative to a second metallocene catalyst containing a transition metal compound of Chemical Formula 2 may be 1:0.5 to 2:1 to 5.

If the molar ratio of the second metallocene catalyst containing the transition metal compound of Chemical Formula 2 relative to the first metallocene catalyst containing the transition metal compound of Chemical Formula 1 is too low, the proportion of the polyethylene copolymer having a low molecular weight among the synthesized polyethylene copolymer decreases and the processability of the final product may be deteriorated. In addition, if the molar ratio of the second metallocene catalyst containing the transition metal compound of Chemical Formula 2 relative to the first metallocene catalyst containing the transition metal compound of Chemical Formula 1 is too high, the proportion of the polyethylene copolymer having a high molecular weight among the synthesized polyethylene copolymer decreases and the environmental stress crack resistance and the spiral flow length of the final product can be lowered.

Further, if the molar ratio of the third metallocene catalyst containing the transition metal compound of Chemical Formula 3 relative to the first metallocene catalyst containing the transition metal compound of Chemical Formula 1 is too low, the proportion of the polyethylene copolymer having a high molecular weight among the synthesized polyethylene copolymer decreases and the environmental stress crack resistance and the dimensional stability of the final product can be lowered.

If the molar ratio of the third metallocene catalyst containing the transition metal compound of Chemical Formula 3 relative to the first metallocene catalyst containing the transition metal compound of Chemical Formula 1 is too high, the proportion of the polyethylene copolymer having a high molecular weight among the synthesized polyethylene copolymer is excessively increased and the polymer tail is excessively increased to require an excessively high pressure at the time of injection. Consequently, the processability may be deteriorated or the quality of the final product may be deteriorated.

The molar ratio between the second metallocene catalyst containing the transition metal compound of Chemical Formula 2 and the third metallocene catalyst containing the transition metal compound of Chemical Formula 3 is not particularly limited, but it is preferable to use it within the above-mentioned range in order to realize the above effects.

Meanwhile, the catalyst composition for synthesizing an olefin copolymer may further include a cocatalyst or a support.

The cocatalyst is an organometallic compound containing a Group 13 metal, and is not particularly limited as long as it is known to be usable for polymerizing an olefin in the presence of a general metallocene catalyst.

Specifically, the cocatalyst compound may include at least one of an aluminum-containing primary cocatalyst of the following Chemical Formula 6 and a borate-containing secondary cocatalyst of the following Chemical Formula 7.

$$-[Al(X)-O-]_k-$$ [Chemical Formula 6]

In Chemical Formula 6, each X is independently a halogen, or a halogen-substituted or unsubstituted hydrocarbyl group having 1 to 20 carbon atoms, and k is an integer of 2 or more.

$$T^+[BG_4]^-$$ [Chemical Formula 7]

In Chemical Formula 7, $T^+$ is a +1 charge polyatomic ion, B is boron in an oxidation state of +3, and each G is independently selected from the group consisting of a hydride group, a dialkylamido group, a halide group, an alkoxide group, an aryloxide group, a hydrocarbyl group, a halocarbyl group, and a halo-substituted hydrocarbyl group, wherein the G has 20 or less carbon atoms, provided that G is a halide at least one position.

By using the first and second cocatalysts as described above, the polyolefins finally prepared may have more uniform molecular weight distribution, while the polymerization activity can be enhanced.

The first cocatalyst of Chemical Formula 6 may be an alkylaluminoxane-based compound wherein the repeating units are combined into a linear, circular, or network form. Specific examples of the first cocatalyst include methylaluminoxane (MAO), ethylaluminoxane, isobutylaluminoxane, butylaluminoxane, and the like.

Further, the second cocatalyst of Chemical Formula 7 may be a trisubstituted ammonium salt, a dialkylammonium salt, or a trisubstituted phosphate type of borate compound. Specific examples of the second cocatalyst include a borate-based compound in the form of a trisubstituted ammonium salt, such as trimethylammonium tetraphenylborate, methyl dioctadecylammonium tetraphenylborate, triethylammonium tetraphenylborate, tripropylammonium tetraphenylborate, tri(n-butyl)ammonium tetraphenylborate, methyltetradecyloctadecylammonium tetraphenylborate, N,N-dimethylanilinium tetraphenylborate, N,N-diethylanilinium tetraphenylborate, N,N-dimethyl(2,4,6-trimethylanilinium)tetraphenylborate, trimethylammonium tetrakis(pentafluorophenyl)borate, methylditetradecylammonium tetrakis(pentaphenyl)borate, methyldioctadecylammonium tetrakis(pentafluorophenyl)borate, triethylammonium, tetrakis(pentafluorophenyl)borate, tripropylammonium tetrakis (pentafluorophenyl)borate, tri(n-butyl)ammonium tetrakis (pentafluorophenyl)borate, tri(sec-butyl)ammonium tetrakis (pentafluorophenyl)borate, N, N-dimethylanilinium tetrakis (pentafluorophenyl)borate, N, N-diethylanilinium tetrakis (pentafluorophenyl)borate, N, N-dimethyl(2,4,6-trimethylanilinium)tetrakis(pentafluorophenyl)borate, trimethylammonium tetrakis(2,3,4,6-tetrafluorophenyl)borate, triethylammonium tetrakis(2,3,4,6-tetrafluorophenyl) borate, tripropylammonium tetrakis(2,3,4,6-tetrafluorophenyl)borate, tri(n-butyl)ammonium tetrakis(2,3,4,6-tetrafluorophenyl)borate, dimethyl(t-butyl)ammonium tetrakis(2,3,4,6-tetrafluorophenyl)borate, N, N-dimethylanilinium tetrakis(2,3,4,6-tetrafluorophenyl)borate, N,N-diethylanilinium tetrakis(2,3,4,6-tetrafluorophenyl)borate or N, N-dimethyl-(2,4,6-trimethylanilinium)tetrakis-(2,3,4,6-tetrafluorophenyl)borate and the like; a borate-based compound in the form of a dialkylammonium salt, such as dioctadecylammonium tetrakis(pentafluorophenyl)borate, ditetradecylammonium tetrakis(pentafluorophenyl) borate or dicyclohexylammonium tetrakis(pentafluorophenyl)borate; or a borate-based compound in the form of a trisubstituted phosphonium salt, such as triphenylphosphonium tetrakis(pentafluorophenyl)borate, methyldioctadecylphosphonium tetrakis(pentafluorophenyl)borate, or tri(2,6-dimethylphenyl)phosphonium tetrakis(pentafluorophenyl)borate.

The mass ratio of the support relative to the total weight of the transition metals contained in the first metallocene compound, the second metallocene compound, and the third metallocene compound may be 10 to 10,000. When the support and the metallocene compound are contained in the range of the above mass ratio, an optimal shape can be provided.

Further, the mass ratio of the cocatalyst compound to the support may be 1:1 to 1:100.

When the cocatalyst and the metallocene compound are contained in the mass ratio, the activity and the polymer microstructure can be optimized.

Meanwhile, as the support, a support containing a hydroxy group on its surface can be used, and preferably a support having a highly reactive hydroxy group and siloxane group, of which the surface is dried and removed of moisture, can be used.

For example, silica, silica-alumina, silica-magnesia, or the like, which are dried at high temperature, can be used, and they may typically contain oxides, carbonates, sulfates, and nitrates such as $Na_2O$, $K_2CO_3$, $BaSO_4$, and $Mg(NO_3)_2$.

The drying temperature of the support is preferably 200 to 800° C., more preferably 300 to 600° C., and most preferably 300 to 400° C. If the drying temperature of the support is lower than 200° C., it retains excessive moisture such that moisture on the surface is reacted with the cocatalyst. If the drying temperature is higher than 800° C., pores on the surface of the support are combined with each other to reduce the surface area, and many hydroxyl groups are lost on the surface to only leave siloxane groups. Thus, since the reactive sites with cocatalyst are reduced, it is not preferable.

The amount of hydroxyl groups on the surface of the support is preferably 0.1 to 10 mmol/g, and more preferably 0.5 to 5 mmol/g. The amount of hydroxyl groups on the surface of the support may be controlled depending on the preparation method and conditions of the support, or drying conditions such as temperature, time, vacuum, spray drying, and the like.

If the amount of hydroxyl groups is less than 0.1 mmol/g, the reactive sites with the cocatalyst are reduced. If the amount of hydroxyl groups is more than 10 mmol/g, it is not desirable because it may be caused by moisture in addition to the hydroxyl groups present on the surface of support particles.

Meanwhile, the catalyst composition for synthesizing an olefin copolymer can be produced by a method including the steps of supporting a cocatalyst compound on a support, and sequentially supporting one selected among the first metallocene compound, the second metallocene compound, and the third metallocene compound on the support or simultaneously supporting two or more of the metallocene compounds.

The order of supporting the first metallocene compound, the second metallocene compound, and the third metallocene compound may be changed as needed.

A hydrocarbon-based solvent such as pentane, hexane, heptane, or the like, or an aromatic solvent such as benzene, toluene, or the like, can be used as a reaction solvent in the preparation of the catalyst composition for synthesizing the olefin copolymer. Further, the metallocene compound and the cocatalyst compound can be used in a form supported on silica or alumina.

The catalyst composition for synthesizing the olefin copolymer can itself be used for the polymerization of olefinic monomers. Further, the catalyst composition for synthesizing the olefin copolymer may be prepared and used as a pre-polymerized catalyst by contacting the catalyst with an olefinic monomer. For example, it may be prepared and used as a pre-polymerized catalyst by contacting the catalyst with an olefinic monomer such as ethylene, propylene, 1-butene, 1-hexene, 1-octene, etc.

Meanwhile, the present disclosure provides a method for preparing an olefin copolymer, the method including a step of copolymerizing ethylene and an alpha-olefin in the presence of the above-described catalyst composition for synthesizing an olefin copolymer.

The olefinic monomer may include ethylene, alpha-olefin, cyclic olefin, diene olefin, or triene olefin having two or more double bonds. Specific examples of the olefinic monomer may include ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidene norbornene, phenylnorbornene, vinyl norbornene, dicyclopentadiene, 1,4-butadiene, 1,5-pentadiene, 1,6-hexadiene, styrene, alpha-methylstyrene, divinylbenzene, 3-chloromethylstyrene, etc., and these monomers may be copolymerized by mixing two or more thereof.

The olefinic polymer may more preferably be an ethylene/alpha olefin copolymer, but is not limited thereto.

In the case where the olefinic polymer is an ethylene/alpha-olefin copolymer, the content of alpha-olefin as a comonomer is not particularly limited, and it may be appropriately selected according to the use or purpose of the olefinic polymer. More specifically, the content may be more than 0 mol % and 99 mol % or less.

The copolymerization reaction or polymerization reaction may be carried out by homopolymerizing one type of olefinic monomer or copolymerizing two or more types of monomers, using a continuous slurry polymerization reactor, a loop slurry reactor, a gas phase reactor, or a solution reactor.

The copolymerization temperature may be about 25 to about 500° C., preferably about 25 to about 200° C., and more preferably about 50 to about 150° C. Further, the polymerization pressure may be from about 1 to about 100

Kgf/cm², preferably from about 1 to about 50 Kgf/cm², and more preferably from about 5 to about 30 Kgf/cm².

The catalyst composition for synthesizing the olefin copolymer may be injected after being dissolved or diluted in an aliphatic hydrocarbon solvent having 5 to 12 carbon atoms, for example, pentane, hexane, heptane, nonane, decane, and isomers thereof, an aromatic hydrocarbon solvent such as toluene and benzene, or a hydrocarbon solvent substituted with a chlorine atom such as dichloromethane and chlorobenzene. It is preferable that the solvent is used after a small amount of water, air, or the like acting as a catalyst poison is removed by treating with a small amount of aluminum. It can also be performed using an additional cocatalyst.

On the other hand, the characteristics of the olefin copolymer provided in the process for producing the olefin copolymer using the catalyst composition for synthesizing the olefin copolymer are as follows.

The weight average molecular weight (Mw) of the olefin copolymer may be 100,000 to 300,000 g/mol. More preferably, the weight average molecular weight may be 120,000 g/mol or more, 130,000 g/mol or more, or 140,000 g/mol or more, and 250,000 g/mol or less, 220,000 g/mol or less, or 200,000 g/mol or less.

The olefinic polymer according to the present invention may have a molecular weight distribution (Mw/Mn) of 10 to 30, or 15 to 25. The olefinic polymer having such a broad molecular weight distribution can exhibit excellent processability.

The density of the olefinic copolymer may be 0.930 to 0.960 g/cm³, but is not limited thereto.

Further, the olefinic copolymer may have $MFR_{2.16}$ (melt flow rate ratio, measured at 190° C. under a load of 2.16 kg according to ASTM D1238) of 0.01 to 1.0 g/10 min. More preferably, the $MFR_{2.16}$ may be 0.05 g/10 min or more, 0.1 g/10 min or more, or 0.15 g/10 min or more, and 0.9 g/10 min or less, 0.8 g/10 min or less, or 0.6 g/10 min or less.

Further, the olefinic copolymer has $MFRR_{5/2.16}$ (a value in which a melt flow index measured at 190° C. under a load of 5 kg according to ASTM D1238 is divided by a melt flow index measured at 190° C. under a load of 2.16 kg) of 5 to 10.

More preferably, the $MFRR_{5/2.16}$ may be 3 or more, 3.2 or more, or 3.3 or more, and 9 or less, 9.5 or less, or 8 or less.

The spiral flow length (190° C., 90 bar) indicates the processability of the ethylene/alpha-olefin copolymer, in which the greater the value thereof, the better the processability. For example, the spiral flow length (SF) of the olefin copolymer, measured with a mold thickness of 1.5 mm, an injection temperature of 190° C., a mold temperature of 50° C., and an injection pressure of 90 bar using an ENGEL 150-Ton injection machine, may be more than 13 cm or 15 cm or more.

In addition to the mechanical properties and processability as described above, the above olefin copolymer also has a feature that it has excellent environmental stress crack resistance (ESCR).

In general, the processability and the environmental stress crack resistance are conflicting physical properties. If the melt index is increased to improve the processability, the environmental stress crack resistance is lowered, but the olefin copolymer satisfies both good processability and environmental stress crack resistance.

The olefin copolymer may have environmental stress crack resistance (ESCR) of 200 hours or more, 240 hours or more, or 300 hours or more as measured according to ASTM D 1693. When the environmental stress crack resistance (ESCR) is 200 hours or more, the performance can be stably maintained in the state of use for a bottle cap, so the upper limit is substantially meaningless, but it may be 1000 hours or less, 800 hours or less, or about 500 hours or less. As described above, since the olefin copolymer exhibits high performance environmental stress crack resistance, it is highly stable even when molded into a food container product such as a bottle cap and used under high temperature and high pressure conditions, thereby maintaining continuous performance.

Specifically, the olefin copolymer provided by the process for producing an olefin copolymer using the catalyst composition for synthesizing an olefin copolymer may have a molecular weight of 100,000 to 300,000 g/mol, a molecular weight distribution (Mw/Mn) of 5 to 30, a density of 0.930 to 0.960 g/cm³, and $MFRR_{5/2.16}$ (a value in which a melt flow index measured at 190° C. under a load of 5 kg according to ASTM D1238 is divided by a melt flow index measured at 190° C. under a load of 2.16 kg) of 1 to 10. Further, in a GPC curve graph in which the x axis is log Mw and the y axis is dw/dlog Mw, the integration value in a region where log Mw is 5.0 or more and less than 5.5 may be 20% or more of the total x-axis integration value. Consequently, the olefin copolymer can have excellent environmental stress crack resistance and stiffness characteristics, and can also have excellent stiffness in a polymer injection product, and further, can have high dimensional stability in which the shape does not substantially change despite changes in temperature and pressure after injection.

More specifically, in a GPC curve graph in which the x axis for the olefin copolymer is log Mw and the y axis is dw/dlog Mw, the integration value in a region where log Mw is 5.0 or more and less than 5.5 can be 20% to 30% of the total x-axis integration value.

In a GPC curve graph in which the x axis for the olefin copolymer is log Mw and the y axis is dw/dlog Mw, if the integration value in a region where log Mw is 5.0 or more and less than 5.5 is less than 20% of the total x-axis integration value, the stiffness of the olefin copolymer may be deteriorated or it may be easily broken. Therefore, when the olefin copolymer is applied to a product such as a food container or a bottle cap, a problem that it may be easily broken or the product may explode may arise, and further, it may be difficult to secure chemical resistance.

On the other hand, in a GPC curve graph in which the x axis for the olefin copolymer is log Mw and the y axis is dw/dlog Mw, the integration value in a region where the log Mw is 4.5 or more and less than 5.0 may be 25% or more of the total x-axis integration value. In the GPC curve graph, a region where the log Mw is 4.5 or more and less than 5.0 may be related to the stiffness and dimensional stability of the olefin copolymer, and when the integration value in these regions is 25% or more and 25% to 40% of the total x-axis integration value, the olefin copolymer may satisfy the above-mentioned characteristics.

Compared to the total x-axis integration value in a GPC curve graph in which the x axis for the olefin copolymer is log Mw and the y axis is dw/dlog Mw, the difference between the ratio of the integration value in the region where the log Mw is 4.5 or more and less than 5.0 and the ratio of the integration value in the region where log Mw is 5.0 or more and less than 5.5 may be 7% or less, or 1% to 7%.

As described above, compared to the total x-axis integration value in the GPC curve graph, the difference between the ratio of the integration value in a region where log Mw is 4.5 or more and less than 5.0 and the ratio of the integration value in a region where log Mw is 5.0 or more and less than 5.5 is 7% or less, or 1% to 7%, and thus the olefin copolymer cannot be easily broken while having high stiffness required for polymer injection products. Thereby, it can be applied to high stiffness containers and high stiffness bottle caps that require high pressure resistance and chemical resistance.

Compared to the total x-axis integration value in a GPC curve graph in which the x axis for the olefin copolymer is log Mw and the y axis is dw/dlog Mw, when the difference between the ratio of the integration value in the region where the log Mw is 4.5 or more and less than 5.0 and the ratio of the integration value in the region where the log Mw is 5.0 or more and less than 5.5 is more than 7%, the olefin copolymer exhibits an excessively high bimodal molecular weight distribution pattern or multimodal molecular weight distribution pattern (bimodality, multimodality), and thus problems such as easily cracking due to external shocks and large deformation according to changes in temperature and pressure arise, so that they may not be suitable for products such as food containers and bottle caps.

The Mw means a weight average molecular weight, and w means a mass fraction. Also, based on the molecular weight measured by a method such as GPC or the like, it is possible to define a GPC curve graph in which the x axis is log Mw and the y axis is dw/dlog Mw.

Advantageous Effects

According to the present invention, a catalyst composition for synthesizing an olefin copolymer which can not only have a wide range of melt flow index and melt flow rate ratio, and thus excellent processability, but can also have high molecular weight, broad molecular weight distribution, and high long-chain branch content, and thus exhibit high dimensional stability while having excellent environmental stress crack resistance and processability, thereby providing an olefin copolymer which can be preferably used for a food container, a bottle cap, or the like requiring stability and chemical resistance in a high temperature and high pressure environment, and a process for producing an olefin copolymer using the catalyst composition for synthesizing an olefin copolymer, may be provided.

DETAILED DESCRIPTION OF THE EMBODIMENTS

The present invention will be described in more detail with reference to the following examples. However, these examples are given for illustrative purposes only, and the scope of the invention is not intended to be limited thereto.

Preparation Example

Preparation Example of First Metallocene Compound

Preparation Example 1

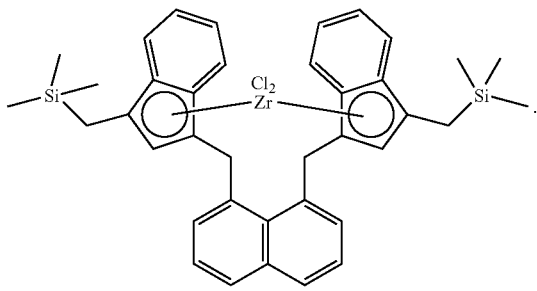

6.3 g (20 mmol) of 1,8-bis(bromomethyl)naphthalene and 8.3 g (40 mmol) of methyl TMS-indene lithium salt were dissolved in 80 mL of THF, respectively, then combined dropwise in a dry ice/acetone bath, and the mixture was stirred overnight at room temperature. After completion of the stirring, the reaction product was extracted with ether/water, the organic layer was treated with $MgSO_4$ to remove residual moisture, and the solvent was removed under vacuum and reduced pressure to obtain 11.1 g of a liquid ligand compound (20 mmol, Mw 556.93).

11 g of the obtained ligand compound was dissolved in a mixed solvent of 80 mL of toluene and 5 mL of methyl tertiary butyl ether (MTBE), 16.7 mL (41.6 mmol) of a 2.5 M n-butyllithium hexane solution was added dropwise thereto, and the mixture was stirred at room temperature. Then, 7.5 g (19.8 mmol) of $ZrCl_4(THF)_2$ was added to 80 mL of toluene to prepare a slurry, which was then transferred in a dry ice/acetone bath and stirred overnight at room temperature.

After completion of the stirring, the slurry was filtered to remove LiCl, the filtrate was dried under vacuum to remove toluene, and 100 mL of hexane was added thereto and the mixture was sonicated for 1 hour. Thereafter, the slurry was filtered to obtain 4.5 g of a metallocene compound as a filtered solid (yield 62.3 mol %, yellow solid).

$^1$H NMR (500 MHz, $CDCl_3$): 8.16-6.95 (14H, m), 5.99 (2H, d), 3.99 (2H, m), 3.83 (2H, m), 3.39 (2H, m), 0.15 (18H, d)

Preparation Example of Second Metallocene Compound

Preparation Example 2

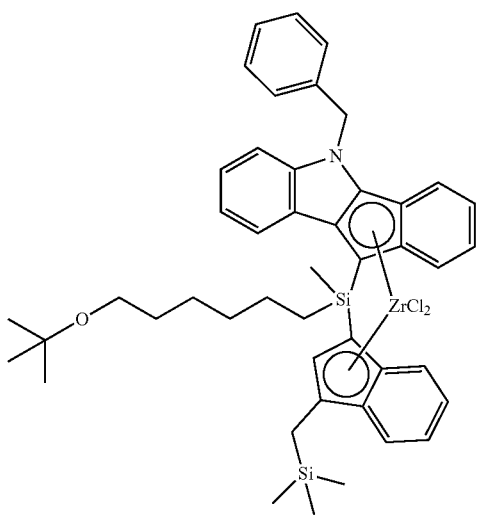

1) Preparation of Ligand Compound 3 g (10 mmol) of indenoindole was added to a first dry 250 mL Schlenk flask, and was then dissolved in 100 mL of hexane. Then, 4.4 mL (11 mmol) of a 2.5 M nBuLi hexane solution was slowly added dropwise thereto, and the reaction mixture was slowly warmed to room temperature and then stirred until the next day. 2.7 g (10 mmol) of (6-tert-butoxyhexyl)dichloro(methyl)silane was added to a second 250 mL Schlenk flask, and was then dissolved in 50 mL of hexene. Then, the moisture was cooled to −78° C., and then a solution of first 250 mL Schlenk flask was injected through a cannula.

After completion of the injection, the temperature of the Schlenk flask was raised to room temperature and stirred for one day. 2.1 g (10 mmol) of methyl TMS-indene lithium salt was dissolved in 100 mL of THF, added dropwise thereto, and stirred overnight at room temperature. After completion of the stirring, the reaction product was extracted with ether/water, the organic layer was treated with $MgSO_4$ to remove residual moisture, and the solvent was removed under vacuum and reduced pressure to obtain 7 g of a liquid ligand compound (10 mmol, Mw: 696.1).

$^1$H NMR (500 MHz, $CDCl_3$): 7.86-7.11 (17H, m), 5.11-5.64 (3H, d), 4.16 (1H, m), 3.20 (2H, m), 1.61-1.47 (6H, m), 1.15 (9H, s), −0.34 (3H, m)

2) Preparation of Metallocene Compound 5.5 g (7.9 mmol) of the obtained ligand compound was dissolved in 80 mL of toluene, 6.6 mL (16.6 mmol) of a 2.5 M n-butyllithium hexane solution was added dropwise thereto, and the mixture was stirred at room temperature. Then, 3 g (7.9 mmol) of $ZrCl_4(THF)_2$ was added to 80 mL of toluene to prepare a slurry, which was then transferred in a dry ice/acetone bath and stirred overnight at room temperature.

After completion of the stirring, the slurry was filtered to remove LiCl, and the filtrate was dried under vacuum to remove toluene, and 100 mL of hexane was added thereto and the mixture was sonicated for 1 hour. Thereafter, the slurry was filtered to obtain 1.5 g of metallocene compound as a filtered solid (yield 23 mol %, red solid).

$^1$H NMR (500 MHz, $CDCl_3$): 7.66-7.20 (17H, m), 6.15-5.71 (1H, d), 5.65 (2H, m), 3.76 (2H, m), 3.20 (2H, m), 1.51-1.29 (4H, m), 1.15 (3H, s), 0.01 (9H, s)

Preparation Example of Third Metallocene Compound

Preparation Example 3

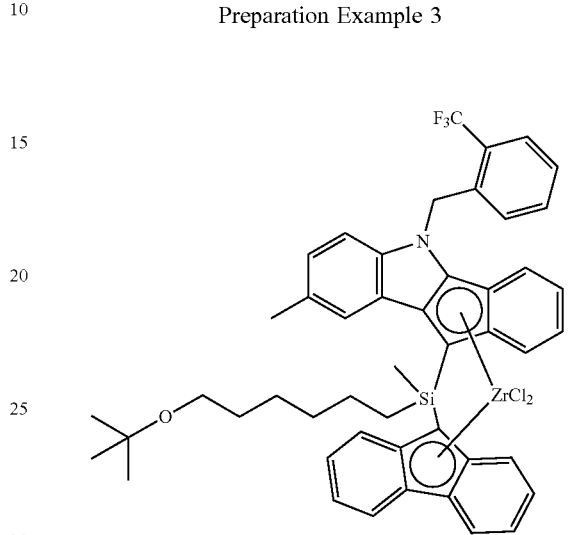

1) Preparation of Ligand Compound

A solution of 2.9 g (7.4 mmol) of 8-methyl-5-(2-(trifluoromethyl)benzyl)-5,10-dihydroindeno[1,2-b]indole was dissolved in 100 mL of hexane and 2 mL (16.8 mmol) of MTBE tertiary butyl ether), and 3.2 mL (8.1 mmol) of 2.5 M n-BuLi hexane solution was added dropwise thereto in a dry ice/acetone bath and stirred overnight at room temperature. In another 250 mL Schlenk flask, 2 g (7.4 mmol) of (6-tert-butoxyhexyl)dichloro(methyl)silane was dissolved in 50 mL of hexane and then added dropwise in a dry ice/acetone bath, and a lithiated slurry of (2-trifluoromethyl)benzyl)-5,10-dihydroindeno[1,2-b]indole was added dropwise via a cannula. After the injection was completed, the mixture was slowly raised to room temperature and stirred at room temperature overnight. At the same time, 1.2 g (7.4 mmol) of fluorene was dissolved in 100 mL of THF, and 3.2 mL (8.1 mmol) of 2.5 M n-BuLi hexane solution was added dropwise in a dry ice/acetone bath and stirred overnight at room temperature.

The reaction solution (Si solution) of 8-methyl-5-(2-(trifluoromethyl)benzyl)-5,10-dihydroindeno[1,2-b]indole and (6-(tert-butoxy)hexyl)dichloro(methyl)silane was subjected to NMR sampling to confirm the completion of the reaction.

$^1$H NMR (500 MHz, $CDCl_3$): 7.74-6.49 (11H, m), 5.87 (2H, s), 4.05 (1H, d), 3.32 (2H, m), 3.49 (3H, s), 1.50-1.25 (8H, m), 1.15 (9H, s), 0.50 (2H, m), 0.17 (3H, d)

After the synthesis was confirmed, a lithiated solution of fluorene was slowly added dropwise to the Si solution in a dry ice/acetone bath, and the mixture was stirred overnight at room temperature. After the reaction, the residue was extracted with ether/water, and the organic layer was treated with $MgSO_4$ to remove residual moisture. The solvent was removed under vacuum and reduced pressure to obtain 5.5 g (7.4 mmol) of an oily ligand compound, which was confirmed by 1H-NMR.

$^1$H NMR (500 MHz, CDCl$_3$): 7.89-6.53 (19H, m), 5.82 (2H, s), 4.26 (1H, d), 4.14-4.10 (1H, m), 3.19 (3H, s), 2.40 (3H, m), 1.35-1.21 (6H, m), 1.14 (9H, s), 0.97-0.9 (4H, m), −0.34 (3H, t).

2) Preparation of Metallocene Compound 5.4 g (Mw 742.00, 7.4 mmol) of the synthesized ligand compound was dissolved in 80 mL of toluene and 3 mL (25.2 mmol) of MTBE, and 7.1 mL (17.8 mmol) of 2.5 M n-BuLi hexane solution was added dropwise in a dry ice/acetone bath and stirred overnight at room temperature. 3.0 g (8.0 mmol) of ZrCl$_4$(THF)$_2$ was added to 80 mL of toluene to prepare a slurry. 80 mL of ZrCl$_4$(THF)$_2$ as a toluene slurry was transferred to a ligand-Li solution in a dry ice/acetone bath and stirred overnight at room temperature.

The reaction mixture was filtered to remove LiCl, the filtrate was dried under vacuum to remove toluene, and 100 mL of hexane was added thereto and sonicated for 1 hour. This was filtered to obtain 3.5 g of a purple metallocene compound as a filtered solid (yield 52 mol %).

$^1$H NMR (500 MHz, CDCl$_3$): 7.90-6.69 (9H, m), 5.67 (2H, s), 3.37 (2H, m), 2.56 (3H, s), 2.13-1.51 (11H, m), 1.17 (9H, s).

Preparation Example of Hybrid Supported Catalyst

Example 1

3.0 kg of a toluene solution was added to a 20 L SUS autoclave, and the reactor temperature was maintained at 40° C. 1000 g of silica (manufactured by Grace Davison, SYLOPOL 948) was dehydrated by applying vacuum for 12 hours at a temperature of 600° C., and then added to a reactor to sufficiently disperse the silica. The metallocene compound of Preparation Example 1 was then dissolved in toluene at a ratio of 0.1 mmol per 1 g of SiO$_2$ and then added thereto. The mixture was allowed to react at 40° C. for 2 hours while stirring. Then, the stirring was stopped, followed by settling for 30 minutes and decantation of the reaction solution.

Then, 3 kg of a 10 wt % methylaluminoxane (MAO)/toluene solution was added to the reactor, and the mixture was stirred at 200 rpm at 40° C. for 12 hours. The metallocene compound of Preparation Example 2 was then dissolved in toluene at a ratio of 0.05 mmol per 1 g of SiO$_2$ and added thereto. The mixture was allowed to react while stirring at 200 rpm at 40° C. for 12 hours. Then, the metallocene compound of Preparation Example 3 was dissolved in toluene at a ratio of 0.15 mmol per 1 g of SiO$_2$ and added thereto. The mixture was allowed to react while stirring at 200 rpm at 40° C. for 12 hours.

Thereafter, 3.0 kg of hexane was added to the reactor, a hexane slurry was transferred to a filter dryer, and the hexane solution was filtered. The filtrate was dried under reduced pressure at 40° C. for 4 hours to prepare 1 kg of a SiO$_2$ hybrid supported catalyst.

Example 2

A supported catalyst was prepared in the same manner as in Example 1, except that the addition amount of the metallocene compound of Preparation Examples 1 to 3 was changed.

Comparative Example 1

A polyethylene copolymer (ME1000, manufactured by LG Chem Ltd) prepared with a Ziegler-Natta catalyst was used as Comparative Example 1.

Experimental Example

Ethylene-1-Hexene Copolymerization

The respective hybrid supported metallocene catalysts prepared in each of the examples were respectively fed into a CSTR continuous polymerization reactor (reactor volume: 50 L, reaction flow rate: 7 m/s) to prepare an olefin polymer. 1-hexene was used as the comonomer, the reactor pressure was set to 10 bar, and the polymerization temperature was maintained at 90° C.

The polymerization conditions using the respective hybrid supported metallocene catalysts of Examples 1 to 3 are summarized in Table 1 below.

TABLE 1

| | | Polymerization condition | | |
|---|---|---|---|---|
| | Catalyst | Pressure (bar)/ temperature (° C.) | Hydrogen (g/hr) | 1-hexene (cc/min) |
| Example 1 | Preparation Example 1 0.10 mmol/g SiO$_2$ Preparation Example 2 0.05 mmol/g SiO$_2$ Preparation Example 3 0.15 mmol/g SiO$_2$ | 10/90 | 3.0 | 6 |
| Example 2 | Preparation Example 1 0.07 mmol/g SiO$_2$ Preparation Example 2 0.07 mmol/g SiO$_2$ Preparation Example 2 0.15 mmol/g SiO$_2$ | 10/90 | 3.0 | 6 |

Evaluation of Physical Properties of Polymer

1) Melt Index (MFR, 2.16 kg/21.6 kg): Measurement temperature 190° C., ASTM 1238

2) MFRR (MFR$_{21.6}$/MFR$_{2.16}$): the ratio where MFR$_{21.6}$ melt index (MI, load: 21.6 kg) is divided by MFR$_{2.16}$ (MI, load: 2.16 kg).

3) Molecular weight and molecular weight distribution: 1,2,4-trichlorobenzene containing 0.0125% of BHT was dissolved using a PL-SP260 system at 160° C. for 10 hours and subjected to pretreatment. The number average molecular weight and the weight average molecular weight were measured at a temperature of 160° C. using a PL-GPC220 system.

The molecular weight distribution was represented by the ratio between the weight average molecular weight and the number average molecular weight.

Then, using the measured GPC data, a GPC curve graph in which the x axis was log Mw and the y axis was dw/dlog Mw was derived.

5) Environmental Stress Crack Resistance (ESCR): The time to F50 (50% failure or cracking) was measured using a 10% Igepal CO-630 Solution at a temperature of 50° C. according to ASTM D 1693.

6) Spiral flow length (SF): An ENGEL 150-ton injection machine was used. The SF was measured under conditions in which the mold thickness was 1.5 mm, the injection temperature was 190° C., the mold temperature was 50° C., and the injection pressure was 90 bar.

7) Dimensional change ratio: A test specimen was prepared from each of the olefin copolymers obtained in the examples and comparative examples, and the dimensional change rate was measured using Dynamic Mechanical Analysis (DMA).

Specifically, the respective olefin copolymers obtained in the examples and comparative examples were pressed with a pressure of 20 MPa at 200° C. for about 5 minutes to prepare a test specimen (width: 6 mm, thickness: 0.3 mm). A step of maintaining the test specimen at a temperature of 32° C. and a pressure of 0.5 MPa for 20 minutes and a step of raising the temperature and maintaining it at a temperature of 60° C. and a pressure of 0.5 MPa for 10 minutes were set to one cycle, and four cycles were repeated.

Strain was recorded under the condition of 32° C. for each cycle, and finally the dimensional change rate was determined by the value obtained by dividing the difference between the strain of the first cycle and the strain of the fourth cycle by the strain value of the first cycle*100(%).

TABLE 2

| Catalyst | MWD (Kg/mol) | MWD | MI | MFRR | Density (g/cm$^3$) | Dimensional change rate (%) | ESCR | Spiral |
|---|---|---|---|---|---|---|---|---|
| Example 1 | 141.941 | 7.3 | 0.31 | 3.35 | 0.949 | 2.02 | 360 | 15 |
| Example 2 | 137.144 | 9.2 | 0.32 | 3.56 | 0.951 | 1.53 | 320 | 17 |
| Comparative Example 1 | 138.940 | 12.2 | 0.9 | 4.0 | 0.952 | 4.35 | 50 | 13 |

As shown in Table 2, it was confirmed the olefin copolymer obtained using the hybrid metallocene catalysts of Examples 1 and 2 had an environmental stress crack resistance of 300 hours or more, exhibited a relatively high spiral flow length, and further exhibited a dimensional change rate of about 2% or less even under the conditions of high temperature and high pressure, thus providing high dimensional stability.

Meanwhile, as confirmed in FIG. 1, the olefin copolymer obtained in each of Examples 1 and 2 showed that in a GPC curve graph in which the x axis was log Mw and the y axis was dw/dlog Mw, the integration value in a region where the log Mw was 5.0 or more and less than 5.5 was about 23% and 21% of the total x-axis integration value, and compared to the total x-axis integration value, the difference of the ratio of the integration value in a region where the log Mw was 5.0 or more and less than 5.5 and the ratio of the integration value in a region where the log Mw was 4.5 or more and less than 5.0 were 6.36% and 5.24%, respectively.

As described above, as the olefin copolymer prepared in each of Examples 1 and 2 showed the above-mentioned numerical values in a GPC curve graph in which the x axis is log Mw and the y axis is dw/dlog Mw, the olefin copolymer can have a characteristics such that it is not easily broken while having high stiffness required for polymer injection products, high pressure resistance and chemical resistance, and excellent dimensional stability, thereby exhibiting a very low strain due to a change in temperature and pressure.

That is, the olefin copolymer obtained using the hybrid metallocene catalysts of Examples 1 and 2 can not only have a wide range of melt flow index and melt flow rate ratio, and thus excellent processability, and can have a high molecular weight, a broad molecular weight distribution, and a high long-chain branch content, but can also have excellent environmental stress crack resistance and processability, and exhibit excellent stability in a high temperature and high pressure environment, whereby it is applied to food containers, bottle caps, or the like, thereby achieving excellent performance.

The invention claimed is:

1. A catalyst composition for synthesizing an olefin copolymer, comprising: a first metallocene catalyst containing a transition metal compound represented by the following Chemical Formula 1;

a second metallocene catalyst containing a transition metal compound represented by the following Chemical Formula 2; and a third metallocene catalyst containing a transition metal compound represented by the following Chemical Formula 3:

[Chemical Formula 1]

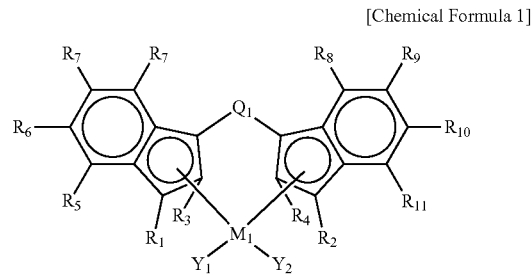

wherein, in the above Chemical Formula 1,
$R_1$ to $R_4$ are the same as or different from each other and each independently represents hydrogen, a halogen, a C1-C20 linear or branched alkyl group, a C2-C20 linear or branched alkenyl group, a C1-C20 linear or branched alkylsilyl group, a C1-C20 linear or branched silylalkyl group, a C1-C20 linear or branched alkoxysilyl group, a C1-C20 linear or branched alkoxy group, a C6-C20 aryl group, a C7-C20 alkylaryl group, or a C7-C20 arylalkyl group, $Q_1$ represents a C4-C20 alkylene group, a C4-C20 alkenylene group, a C6-C20 arylene group, a C4-C20 cycloalkylene group, a C7-C22 arylalkylene group, or a C5-C22 cycloalkyl alkylene group, $R_5$ to $R_{11}$ are the same as or different from each other and each independently represents hydrogen, a halogen, a C1-C20 linear or branched alkyl group, a C2-C20 linear or branched alkenyl group, a C1-C20 linear or branched alkylsilyl group, a C1-C20 linear or branched silylalkyl group, a C1-C20 linear or branched alkoxysilyl group, a C1-C20 linear or branched alkoxy group, a C6-C20 aryl group, a C7-C20 alkylaryl group, or a C7-C20 arylalkyl group, two or more adjacent substituents on a benzene ring among $R_5$ to $R_{11}$ can be connected to each other to form a substituted or unsubstituted aliphatic or aromatic ring, $M_1$ is a Group 4 transition metal, and $Y_1$ and $Y_2$ are the same as or different from each other and each independently represents a halogen, a C1-C20 alkyl group, a C2-C20 alkenyl group, a C6-C20 aryl group, a nitro group, an amido group, a C1-C20 alkylsilyl group, a C1-C20 alkoxy group, or a C1-C20 sulfonate group:

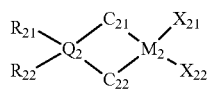
[Chemical Formula 2]

wherein, in the above Chemical Formula 2, $M_2$ is a Group 4 transition metal, $X_{21}$ and $X_{22}$ are the same as or different from each other and each independently represents a halogen, a C1-C20 alkyl group, a C2-C20 alkenyl group, a C6-C20 aryl group, a nitro group, an amido group, a C1-C20 alkylsilyl group, a C1-C20 alkoxy group, or a C1-C20 sulfonate group, $Q_2$ is carbon, silicon, or germanium, $R_{21}$ and $R_{22}$ are the same as or different from each other and each independently represents hydrogen, a halogen, a C1-C20 alkyl group, a C2-C20 alkenyl group, a C6-C20 aryl group, a C7-C20 alkylaryl group, a C7-C20 arylalkyl group, a C1-C20 alkoxy group, a C2-C20 alkoxyalkyl group, a C3-C20 heterocycloalkyl group, or a C5-C20 heteroaryl group, and one of $C_{21}$ and $C_{22}$ is represented by the following Chemical Formula 2a and the other is represented by the following Chemical Formula 2b:

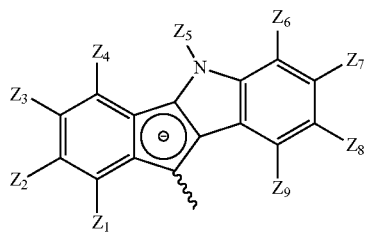
[Chemical Formula 2a]

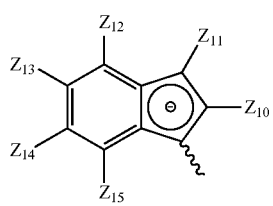
[Chemical Formula 2b]

wherein, in the above Chemical Formula 2a, $Z_1$ to $Z_9$ are the same as or different from each other and each independently represents a hydrogen, a C1-C20 alkyl group, a C2-C20 alkenyl group, a C1-C20 alkoxy group, a C1-C20 alkylsilyl group, a C1-C20 silylalkyl group, a C6-C20 aryl group, a C7-C20 alkylaryl group, or a C7-C20 arylalkyl group, and in the above Chemical Formula 2b, $Z_{10}$ and $Z_{12}$ to $Z_{15}$ are hydrogen, a halogen, and a C1-C3 alkyl group, and $Z_{11}$ is a C1-C20 alkyl group, a C2-C20 alkenyl group, a C1-C20 alkylsilyl group, a C1-C20 silylalkyl group, a C1-C20 alkoxysilyl group, a C1-C20 ether group, a C1-C20 silyl ether group, a C1-C20 silyloxy group, a C1-C20 alkoxy group, a C2-C20 alkoxyalkyl group, a C6-C20 aryl group, a C7-C20 alkylaryl group, or a C7-C20 arylalkyl group:

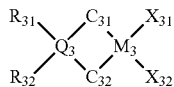
[Chemical Formula 3]

wherein, in the above Chemical Formula 3, $M_3$ is a Group 4 transition metal, $X_{31}$ and $X_{32}$ are the same as or different from each other and each independently represents a halogen, a C1-C20 alkyl group, a C2-C20 alkenyl group, a C6-C20 aryl group, a nitro group, an amido group, a C1-C20 alkylsilyl group, a C1-C20 alkoxy group, or a C1-C20 sulfonate group, $Q_3$ is carbon, silicon, or germanium, $R_{31}$ and $R_{32}$ are the same as or different from each other and each independently represents hydrogen, a halogen, a C1-C20 alkyl group, a C2-C20 alkenyl group, a C6-C20 aryl group, a C7-C20 alkylaryl group, a C7-C20 arylalkyl group, a C1-C20 alkoxy group, a C2-C20 alkoxyalkyl group, a C3-C20 heterocycloalkyl group, or a C5-C20 heteroaryl group, and one of $C_{31}$ and $C_{32}$ is represented by the following Chemical Formula 3a or Chemical Formula 3b, and the other of C31 and C32 is represented by the following Chemical Formula 3c, Chemical Formula 3d, or Chemical Formula 3e:

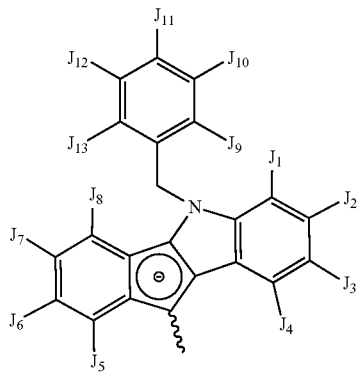
[Chemical Formula 3a]

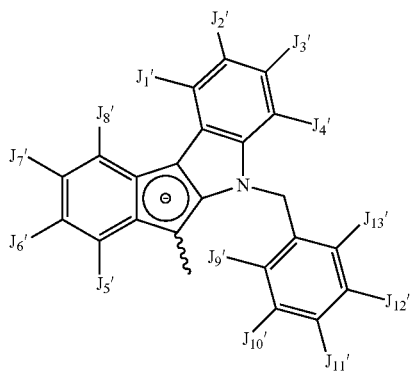
[Chemical Formula 3d]

-continued

[Chemical Formula 3c]

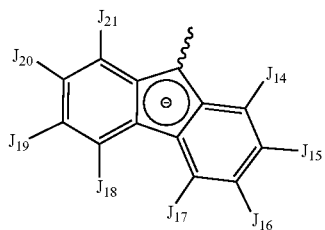

[Chemical Formula 3d]

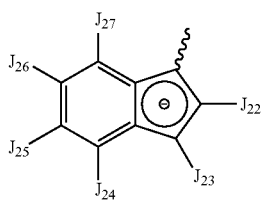

[Chemical Formula 3e]

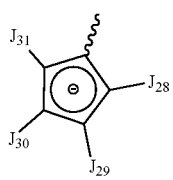

wherein, in the above Chemical Formula 2a, 2b, 3a, 3b, and 3c, $J_1$ to $J_{31}$ and $J_1'$ to $J_{13}'$ are the same as or different from each other and each independently represents hydrogen, a halogen, a C1-C20 alkyl group, a C1-C20 haloalkyl group, a C2-C20 alkenyl group, a C1-C20 alkylsilyl group, a C1-C20 silylalkyl group, a C1-C20 alkoxysilyl group, a C1-C20 alkoxy group, a C6-C20 aryl group, a C7-C20 alkylaryl group, or a C7-C20 arylalkyl group, one or more of $J_9$ to $J_{13}$ and $J_9'$ to $J_{13}'$ is a C1-C20 haloalkyl group, and two or more adjacent substituents on a benzene ring among $J_1$ to $J_{31}$ and $J_1'$ to $J_{13}'$ can be connected to each other to form a substituted or unsubstituted aliphatic or aromatic ring.

2. The catalyst composition for synthesizing an olefin copolymer of claim 1, wherein,
in Chemical Formula 1:
$R_1$ and $R_2$ are a C1-C20 alkylsilyl group or a C1-C20 silylalkyl group,
$R_3$ and $R_4$ are a C6-C20 arylene group or a C8-C22 aryl dialkylene group,
$R_5$ to $R_{11}$ are each independently hydrogen, a halogen, or a C1-C20 linear or branched alkyl group,
$M_1$ is titanium, zirconium, or hafnium, and $Y_1$ and $Y_2$ are independently a halogen.

3. The catalyst composition for synthesizing an olefin copolymer of claim 1, wherein
$Z_1$ to $Z_9$ in Chemical Formula 2a are each independently hydrogen, a methyl group, an ethyl group, a propyl group, an isopropyl group, an n-butyl group, a tert-butyl group, a pentyl group, a hexyl group, a heptyl group, an octyl group, an ethylene group, a propylene group, a butenyl group, a phenyl group, a benzyl group, a naphthyl group, a methoxy group, an ethoxy group, or a tert-butoxyhexyl group,
$Z_{11}$ in Chemical Formula 2b is a methyl group, an ethyl group, a propyl group, an isopropyl group, an n-butyl group, a tert-butyl group, a pentyl group, a hexyl group, a heptyl group, an octyl group, an ethylene group, a propylene group, a butenyl group, a phenyl group, a benzyl group, a naphthyl group, a trimethylsilyl group, a triethylsilyl group, a tripropylsilyl group, a tributylsilyl group, a triisopropylsilyl group, a trimethylsilylmethyl group, a tert-butyldimethylsilyl ether group, a methoxy group, an ethoxy group, or a tert-butoxyhexyl group, and
$R_{21}$ and $R_{22}$ in Chemical Formula 2 are independently a methyl group or a tert-butoxyhexyl group.

4. The catalyst composition for synthesizing an olefin copolymer of claim 1, wherein
$J_1$ to $J_{31}$ and $J_1'$ to $J_{13}'$ in Chemical Formulae 3a, 3b, 3c, 3d, and 3e are each independently hydrogen, a methyl group, an ethyl group, a propyl group, an isopropyl group, an n-butyl group, a tert-butyl group, a pentyl group, a hexyl group, a heptyl group, an octyl group, a phenyl group, a halogen group, a trimethylsilyl group, a triethylsilyl group, a tripropylsilyl group, a tributylsilyl group, a triisopropylsilyl group, a trimethylsilylmethyl group, a methoxy group, or an ethoxy group, and
at least one of $J_9$ to $J_{13}$ and $J_9'$ to $J_{13}'$ is a perfluoroalkyl having 1 to 3 carbon atoms, and
$R_{31}$ and $R_{32}$ in Chemical Formula 3 are each independently hydrogen, a methyl group, an ethyl group, a propyl group, an isopropyl group, an n-butyl group, a tert-butyl group, a methoxymethyl group, a tert-butoxymethyl group, a tert-butoxyhexyl group, a 1-ethoxyethyl group, a 1-methyl-1-methoxyethyl group, a tetrahydropyranyl group, or a tetrahydrofuranyl group.

5. The catalyst composition for synthesizing an olefin copolymer of claim 1, wherein
a molar ratio of a first metallocene catalyst containing a transition metal compound of Chemical Formula 1 and a third metallocene catalyst containing a transition metal compound of Chemical Formula 3 relative to a second metallocene catalyst containing a transition metal compound of Chemical Formula 2 is 1:0.5 to 2:1 to 5.

6. The catalyst composition for synthesizing an olefin copolymer of claim 1, wherein
the catalyst composition for synthesizing an olefin copolymer further includes a cocatalyst and an optional support.

7. The catalyst composition for synthesizing an olefin copolymer of claim 6, wherein
the cocatalyst includes at least one selected from the group consisting of the compounds of the following Chemical Formulae 6 and 7:

—[Al(X)—O—]$_k$—     [Chemical Formula 6]

wherein, in Chemical Formula 6, each X is independently a halogen, or a halogen-substituted or unsubstituted hydrocarbyl group having 1 to 20 carbon atoms, and k is an integer of 2 or more, and $T^+[BG_4]^-$     [Chemical Formula 7]

wherein, in Chemical Formula 7, $T^+$ is a +1 charge polyatomic ion, B is boron in an oxidation state of +3, and G is each independently selected from the group consisting of hydride, dialkylamido group, halide group, alkoxide group, aryloxide group, hydrocarbyl group, halocarbyl group and halo-substituted hydrocarbyl group, wherein the G has 20 or less carbon atoms, provided that G is halide at one or less position.

8. The catalyst composition for synthesizing an olefin copolymer of claim 6, wherein
the mass ratio of the support relative to the total weight of the transition metals contained in the first metallocene compound and the second metallocene compound is 10 to 10,000.

9. The catalyst composition for synthesizing an olefin copolymer of claim 6, wherein
the mass ratio of the cocatalyst compound relative to the support is 1 to 100.

10. A method for preparing an olefin copolymer, the method comprising a step of copolymerizing ethylene and an alpha-olefin in the presence of the catalyst composition for synthesizing an olefin copolymer of claim 1.

* * * * *